May 17, 1960 S. LUBKIN 2,937,371

INFORMATION TRANSFER SYSTEM

Filed July 26, 1955 6 Sheets-Sheet 1

INVENTOR.
SAMUEL LUBKIN

BY S.C. Yuter

ATTORNEY.

May 17, 1960 S. LUBKIN 2,937,371

INFORMATION TRANSFER SYSTEM

Filed July 26, 1955 6 Sheets-Sheet 2

WAVEFORMS DURING TRANSMISSION

INVENTOR.
SAMUEL LUBKIN

BY S.C. Yuter

ATTORNEY

INVENTOR.
SAMUEL LUBKIN
BY S.C. Yuter
ATTORNEY.

WAVEFORMS DURING RECEPTION

INVENTOR.
SAMUEL LUBKIN
BY S. C. Yuter
ATTORNEY.

GATE 122

GATE 122

BUFFER 146

BUFFER 146

DELAY LINE 171

PULSE AMPLIFIER 190

PULSE AMPLIFIER 190

INVENTOR.
SAMUEL LUBKIN
BY S.C. Yuter
ATTORNEY.

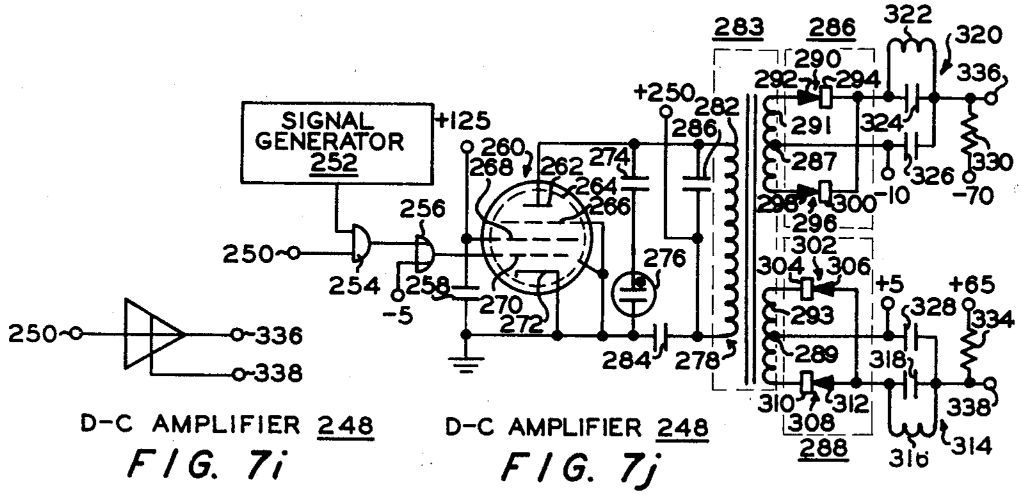
D-C AMPLIFIER 248
FIG. 7i
D-C AMPLIFIER 248
FIG. 7j
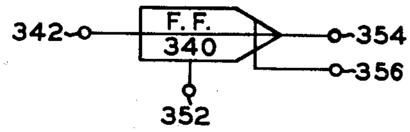
FIG. 7k
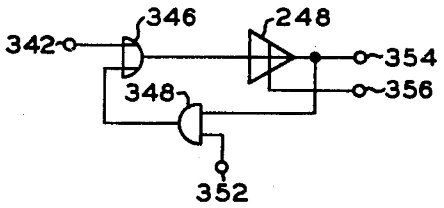
FLIP FLOP 340
FIG. 7l
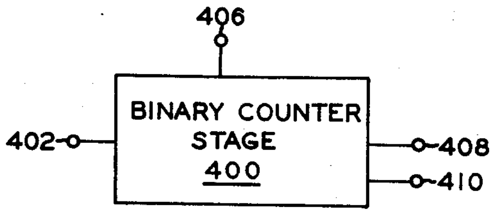
FIG. 7m
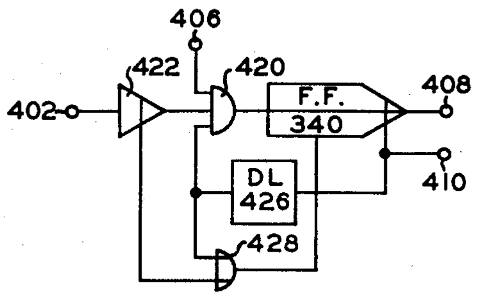
BINARY COUNTER STAGE 400
FIG. 7n
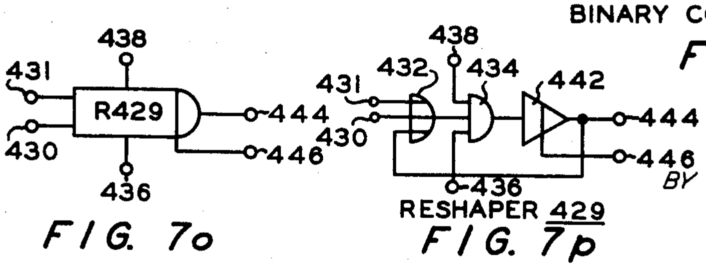
RESHAPER 429
FIG. 7o, FIG. 7p
INVENTOR.
SAMUEL LUBKIN
BY [signature]
ATTORNEY United States Patent Office 2,937,371
Patented May 17, 1960

2,937,371

INFORMATION TRANSFER SYSTEM

Samuel Lubkin, Bayside, N.Y., assignor, by mesne assignments, to Curtiss-Wright Corporation, Carlstadt, N.J., a corporation of Delaware Application July 26, 1955, Serial No. 524,379

5 Claims. (Cl. 340—347)

This invention relates to information transferring and handling systems and more particularly to systems which transfer or handle information represented by signals having one of two possible states.

A typical two-state signal is a sequence of pulses. Such sequences of pulses are presently used to represent information. For example, in telegraphy alphabetic and numeric characters are represented by coded combinations of marks and spaces where the presence of a pulse indicates a mark and the absence of a pulse indicates a space.

A similar type of representation is employed in high-speed information handling systems where the presence of a pulse indicates a binary one and the absence of a pulse indicates a binary zero. In order to achieve the high speeds usually associated with such information processors, the low speed relay techniques of telegraphy are replaced by electronic techniques.

When employing electronic techniques, it is customary to use A.-C. coupling between the stages of the system in order to obtain efficiently the desired signal strength. Hence, most high-speed information transmission and handling systems of the electronic type employ capacitors and transformers as interstage coupling elements.

In magnetic recording systems, for example, it is extremely desirable to energize the recording head by a transformer-coupled amplifier in order to obtain an efficient impedance match between the coupled elements. In addition, low impedance heads can be used since the transformer is able to step up the recording current to obtain a desirable number of ampere turns.

Both capacitors and transformers cannot faithfully transfer the low frequency components of a signal and are unable to transfer a constant or D.-C. voltage. Hence, any signal containing such frequency components is altered since these components are either attenuated or filtered out by the A.-C. coupling elements.

Unfortunately, the usual pulse-no pulse representation always contains such frequency components. Hence, there will always be some alteration and therefore distortion of the total waveform.

In order to minimize the distortion, various elaborate circuit techniques can be employed to preserve the low frequency components of the signal, but these techniques are only partially effective. Amplitude modulation systems may also be employed but as a rule these systems are very complicated and expensive.

In addition to the distortion problem which arises when using the pulse-no pulse representation, a more serious problem concerns the reliability of the information being transferred. Whenever a space or zero is transferred, there is always the question at the receiving station as to whether the space or zero was actually transmitted or whether the transmitter failed in an attempt to transmit a mark or one. The receiver is unable to determine whether a space or zero was actually sent or whether the transmitter "dropped" a pulse.

Likewise, there is the possibility of a noise "spike"

being transmitted and again the receiver cannot ascertain the true representation of the unit of information.

In signaling systems associated with high-speed digital computers, for example, where maximum reliability is essential, the problem is extremely serious since the undetected dropping of a pulse representing a one can cause a serious error in the computations.

It is, therefore, an object of the invention to provide an improved information transferring system.

It is another object of the invention to provide an improved system for handling information in which the signal representing the information has negligible low frequency components and no constant voltage component.

It is a further object of the invention to provide a highly reliable information transferring system.

It is a still further object of the invention to provide an information handling system wherein a recognizable signal is always transmitted.

It is still another object of the invention to provide an information transferring system which will transmit a signal for both a mark or one and a space or zero.

To accomplish these objects it is necessary to represent the information differently. Hence, in accordance with the invention, the information is represented by signals that are dependent on the unit of information being transduced as well as previously transduced units of information.

In accordance with the preferred embodiment of the invention apparatus is provided for transducing a series of signals which represent information of one of two kinds, for example, a zero and a one. Each signal of the series has a given period. Within each signal period the state of the signal changes. The type of change between the states is used as an indication of the unit of information being represented. The type of change is determined by the unit of information to be represented and the first previous unit of information that was represented.

In one form the invention can represent information as square wave signals. Each square wave period is used to represent one unit of information. Within each square wave period there is a shift from one voltage level to a second voltage level. The direction of the shift is changed by varying the phase relationship between two adjacent square wave signals. When a square wave having a fifty percent duty cycle is employed, changes in the direction of the shift are accomplished using periods of square wave signals that are either in phase with each other or one hundred and eighty degrees out of phase with respect to each other.

In one embodiment using square wave signals, a square wave period of a given phase is transmitted for the first unit of information. If the second unit of information is the same then a square wave period of the same phase is transmitted. If the second unit of information is different from the first unit then a square wave period of opposite phase is transmitted.

In another embodiment using square wave signals, a square wave period of a given phase is transmitted for the first unit of information.

Square wave periods of the same phase are transmitted for each following unit of information which is of a first kind. When the unit of information is a second kind, the phase of the square wave changes and the new phase is transmitted until another unit of the first kind is transferred. For example, if the unit of information to be represented is a zero, a square wave signal having the same phase as previously used is transferred and if the unit of information to be represented is a one, a square wave signal opposite in phase to the previously used signal is transferred. It should be noted that the representations of the ones and zeros may be interchanged.

Since a change occurs for each unit of information transmitted, it is possible to detect whether the transmitter is actually transmitting information. Such a check is not possible when using a pulse-no pulse method of transmission.

Other objects, features and advantages of the invention will be disclosed in the following description of the invention wherein:

Fig. 7 shows in detail the blocks used in Fig. 1, Fig. 2, Fig. 4, and Fig. 5 wherein:

Figure 7A:
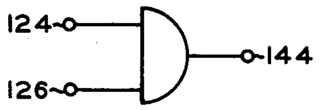

Fig. 7*a* symbolically shows a gate.

Figure 7B:
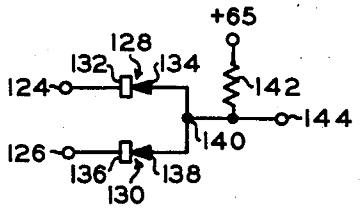

Fig. 7*b* shows the schematic of the gate of Fig. 7*a*.

Figure 7C:
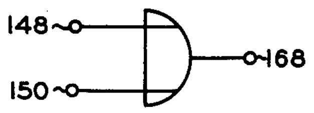

Fig. 7*c* is the symbolic representation of a buffer.

Figure 7D:
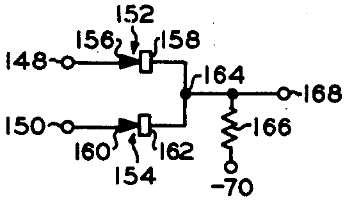

Fig. 7*d* shows the circuit of the buffer of Fig. 7*c*.

Figure 7E:
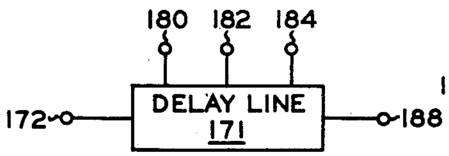

Fig. 7*e* symbolically shows a delay line.

Figure 7F:
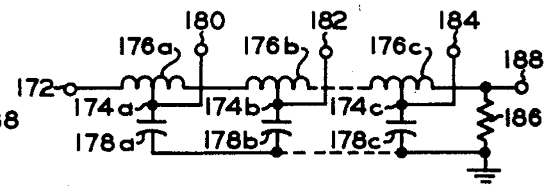

Fig. 7*f* shows the schematic of the delay line of Fig. 7*e*.

Figure 7G:
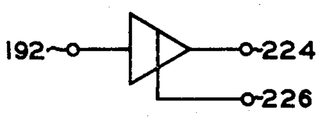

Fig. 7*g* is the symbol for a pulse amplifier.

Figure 7H:
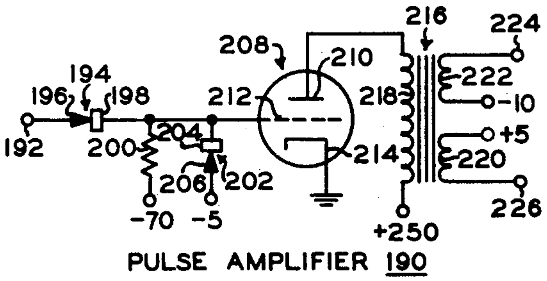

Fig. 7*h* shows the circuitry for the pulse amplifier of Fig. 7*g*.

Fig. 7*i* is the symbolic representation of a D.-C. amplifier.

Fig. 7*j* shows the circuit of the D.-C. amplifier of Fig. 7*i*.

Fig. 7*k* is the symbol for a set-dominant flip-flop.

Fig. 7*l* shows in detail the set-dominant flip-flop of Fig. 7*k* using some of the previously shown symbols.

Fig. 7*m* is the symbol for a binary counter.

Fig. 7*n* shows in detail the binary counter of Fig. 7*m* using some of the previously shown symbols.

Fig. 7*o* shows symbolically a reshaper.

Fig. 7*p* shows the reshaper of Fig. 7*o* using previously cited symbols.

Figure 1:
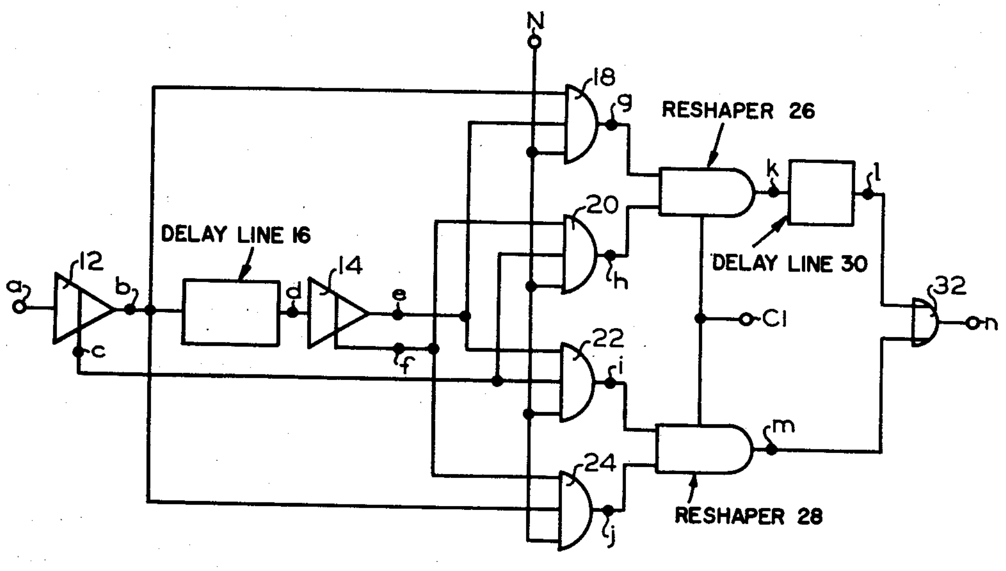
Fig. 1 shows a block diagram of apparatus for converting a pulse-no pulse representation of information to a phase-modulated square wave signal in accordance with one embodiment of the invention.
Figure 2:
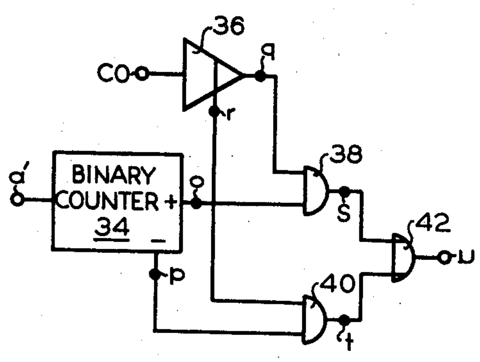
Fig. 2 shows a block diagram of apparatus for converting a pulse-no pulse representation of the information to a second type of phase-modulated square wave signal in accordance with another embodiment of the invention.
Figure 8:
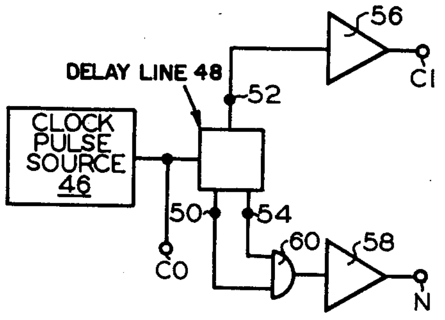

Fig. 8 shows apparatus for generating the timing signals employed by the apparatus of Fig. 1 and Fig. 2.

Fig. 1 illustrates one embodiment of the invention wherein transmission apparatus is provided for converting a pulse-no pulse representation of information to a pulse phase-modulation representation. The information enters the apparatus as a series of pulses wherein the presence of a pulse during an information period indicates a one and the absence of a pulse during an information period indicates a zero. The information leaves the apparatus as a series of pulses. Each information period will either have a pulse present during the first half of the information period or during the second half of the information period. That is, pulses of either one of two phases will be present in each information period.

The conversion occurs according to the following rules. If a one follows a one or a zero follows a zero in time, a pulse is transmitted in the second half of the information period. For the two remaining conditions, a one following a zero or a zero following a one a pulse is transmitted during the first half of the information period.

The apparatus comprises the input amplifier 12, the delay amplifier 14, the memory delay line 16, the one-one gate 18, the zero-zero gate 20, the zero-one gate 22, the one-zero gate 24, the like reshaper 26, the unlike reshaper 28, the phase shifting delay line 30 and the buffer 32.

The input amplifier 12 and the delay amplifier 14 are similar pulse amplifiers.

The pulse amplifiers transmit both positive and negative going pulses. The positive output of the pulse amplifier is normally at a negative potential and upon receipt of a pulse at the input terminal the positive output assumes a positive potential for the duration of the pulse and then returns to the negative potential. The negative output terminal of the pulse amplifier is normally at a positive potential and assumes a negative potential when a pulse is fed to the input terminal *a* of the pulse amplifier. The negative potential is maintained for the duration of the input pulse and then the negative output terminal returns to a positive potential.

The input amplifier 12 has an input terminal *a* which is also the input terminal for the apparatus, a positive output terminal *b* and a negative output terminal *c*. The delay amplifier has an input terminal *d*, a positive output terminal *e* and a negative output terminal *f*.

The memory delay line 16 and phase shifting delay line 30 are lumped parameter delay lines capable of transmitting a signal from their output terminals a predetermined period of time after the receipt of the signal at their input terminals. The memory delay line 16 delays pulse signals one information period. The phase shifting delay line 30 delays pulses one-half an information period.

The one-one gate 18, zero-zero gate 20, zero-one gate 22 and the one-zero gate 24 are gates of the coincidence type. A coincidence gate will pass from its output terminal the most negative signal present at one of its input terminals.

The like reshaper 26 and the unlike reshaper 28 are electronic circuits capable of transmitting well-defined and precisely timed pulses from their output terminals upon receipt of poorly shaped pulses at their input terminals.

The buffer 32, sometimes called an "or" gate, is an electrical circuit capable of transmitting from its output terminal the most positive signal present at its input terminals.

The input terminal *a* of the input amplifier 12 is coupled to the source of information to be converted. The positive output terminal *b* of the input amplifier 12 is connected to an input terminal of the one-one gate 18, to an input terminal of the one-zero gate 24 and the input terminal of the memory delay line 16. The negative output terminal *c* of the input amplifier 12 is connected to an input terminal of the zero-zero gate 20 and an input terminal of the zero-one gate 22. The output terminal *d* of the memory delay line 16 is linked to the input terminal of the delay amplifier 14. The positive output terminal *e* of the delay amplifier 14 is coupled to an input terminal of the one-one gate 18 and an input terminal of the zero-one gate 22. The negative output terminal *f* of the delay amplifier 14 is connected to an input terminal of the zero-zero gate 20 and an input terminal of the one-zero gate 24. A third input terminal of each of the gates is linked to the N signal line. The output terminal *g* of the one-one gate 18 is coupled to an input terminal of the like reshaper 26. The second input terminal of the like reshaper 26 is connected to the output terminal *h* of the one-one gate 20. The output terminal *i* of the zero-one gate 22 is coupled to an input terminal of the memory reshaper 28. The second input terminal of the unlike reshaper 28 is linked to the input terminal *j* of the one-zero gate 24.

The timing input terminal of both reshapers is coupled to the C–1 signal line. The output terminal *k* of the like reshaper 26 is connected to the input terminal of the phase shifting delay line 30. The output terminal *l* of the phase shifting delay line 30 is connected to an input terminal of the buffer 32. The second input terminal of the buffer 32 is coupled to the output terminal *m* of the unlike reshaper 28. The output terminal *n* of the buffer 32 transmits the converted information signal.

Figure 3:
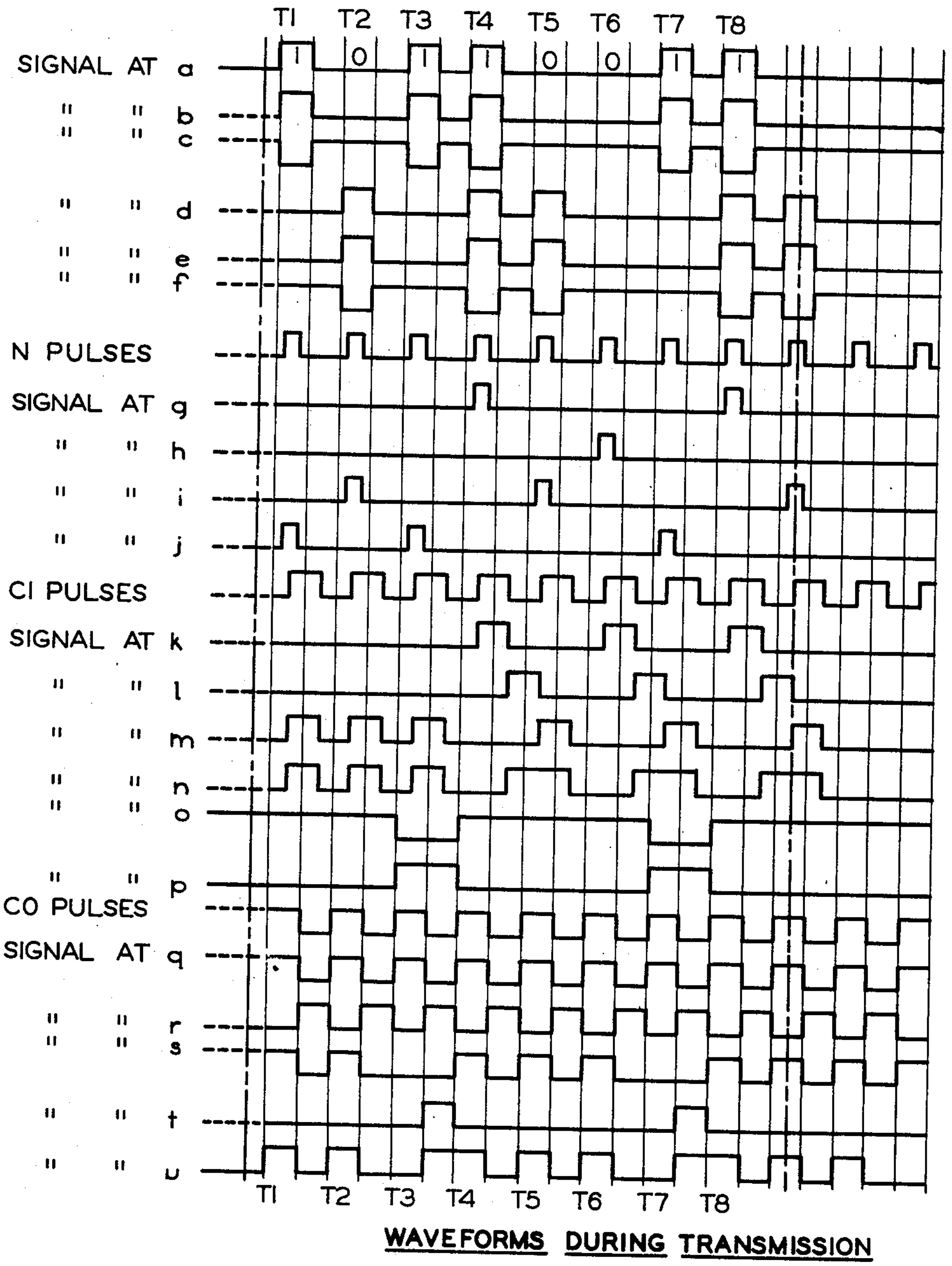
Fig. 3 shows waveforms illustrating the conversion methods of the invention and signals present at pertinent locations in the apparatus shown in Fig. 1 and Fig. 2.

In Fig. 3 are waveforms associated with particular terminals of the apparatus for Fig. 1. The letter designation affixed to each waveform is the same at the terminal designation at which the wave form is present. The abscissa or time axis is divided into equidistant information periods representing equal units of time. Each information period is designated by a particular reference number; for example, the first information period is referred to as T1 and the *n*th information period as T*n*.

The operation of the apparatus for Fig. 1 will now be described with reference to the waveforms of Fig. 3. As a particular example the information signal to be converted is 10110011.

It is assumed that the previous signal was a zero. At T1 the one as represented by a pulse is present at the input terminal *a* and is transmitted as a positive pulse from the positive output terminal *b* and as a negative pulse from the negative output terminal *c*. Since the previous information bit was a zero a narrow N signal is passed by the output terminal *j* of the one-zero gate 24 to the unlike reshaper 28. The unlike reshaper 28 passes a full-width pulse (a pulse having a duration of half an information period) via its output terminal *m* through the buffer 32 to the output terminal *n*. Thus one-quarter of an information period after the pulse representing a one entered the input terminal *a* a pulse lasting half an information period is present at the output terminal *n*.

It should be noted that the pulse present at the output terminal *b* of the input amplifier 12 is also fed to the memory delay line 16 whereafter a one pulse time delay (a one information period delay) the pulse is present at the output terminal *d*. Thus, the bit of information is remembered for one information period.

At time T2 a zero is present at the input terminal *a*, therefore the positive output terminal *b* of the input amplifier 12 remains at a negative potential and the negative output terminal *c* remains at a positive potential. The pulse present at the output terminal *d* of the memory delay line 16 causes a positive pulse to be transmitted by the positive output terminal *e* of the delay amplifier 14. The coincidence of this positive pulse and the positive voltage present on the negative output terminal *c* of the input amplifier 12 at the input terminals of the zero-one gate 22 causes a narrow N pulse to pass to an input terminal of the unlike reshaper 28 via the output terminal *i* of the zero-one gate 22.

A quarter pulse time after the start of the T2 period a pulse lasting half an information period is transmitted from the output terminal of the unlike reshaper 28 to the output terminal *n* of the buffer 32.

At time T3, a one is present at the input terminal *a* causing a positive pulse to be present at the positive output terminal *b* and a negative pulse to be present at the negative output terminal *c* of the input amplifier 12. Since the previous bit of information was a zero, no pulse is present at the output terminal *d* of the memory delay line 16. Therefore, the positive output terminal *e* of the delay amplifier 14 is at a negative potential and the negative output terminal *f* of the delay amplifier 14 is at a positive potential. The coincidence of the positive potential present on the negative output *f* of the delay amplifier 14 and the positive pulse present on the positive output terminal *b* of the input amplifier 12 at the input terminals of the one-zero gate 24 causes a narrow N pulse to be transmitted via the output terminal *j* of the one-zero gate 24 to an input terminal of the unlike reshaper 28. A quarter pulse time after the beginning of the T3 information period the unlike reshaper 28 transmits a pulse from its output terminal *m* to the output terminal *n* via the buffer 32.

Thus whenever a one follows a zero or a zero follows a one a pulse is transmitted from the output terminal *n*. The pulse has a duration of half an information period, the start of the pulse occurs a quarter of a pulse time from the beginning of the information period and terminates three quarters of a pulse time from the beginning of the information period.

At T4 a one is present at the input terminal *a* causing a positive pulse to be present at the positive output terminal *b* and a negative pulse to be present at the negative output terminal *c* of the input amplifier 12. Since a positive pulse was transmitted by the input amplifier 12 via its positive output terminal *b* to the memory delay line 16 at the beginning of the information period T3 this pulse is now present at the output terminal *d* of the memory delay line 16 causing the delay amplifier 14 to transmit a positive pulse from its positive output terminal *e* and a negative pulse from its negative output terminal *f*.

The coincidence of the positive pulse present at the positive output terminal *e* and the positive pulse present at the positive output terminal *b* at input terminals of the one-one gate 18 causes a narrow N pulse to be fed to an input terminal of the like reshaper 26 via the output terminal *g* of the one-one gate 18.

One-quarter information period after the start of the T4 period a pulse is transmitted to the phase shifting delay line 30 via the output terminal *k* of the like reshaper 26. One-half an information period after the pulse entered the phase shifting delay line 30 the pulse appears at the output terminal *l* of the phase shifting delay line 30 and is transmitted to the output terminal *n* via the buffer 32.

Thus three-quarters of an information period after the one was present at the input terminal *a* of the input amplifier 12 a pulse is transmitted by the output terminal *n*. The pulse has a duration of half an information period starting three-quarters of an information period after the information bit entered the apparatus.

At T5 a zero is present at the input terminal 12. Since the previous bit of information was a one the operation is identical to the operation that occurred at T2 and a pulse is transmitted from the output terminal *n* one-quarter pulse time after the start of the T5 information period.

At T6 a zero is present at the input terminal 12 so the positive output terminal *b* and the negative output terminal *c* of the input amplifier 12 remain respectively at a negative and a positive potential. Since the previous information bit was also a zero, no pulse is present at the output terminal *d* of the memory delay line 16 and therefore the positive output terminal *e* and the negative output terminal *f* of the delay amplifier 14 are respectively at a negative and a positive potential.

The coincidence of the positive potentials present at the negative output terminal *f* of the delay amplifier 14 and at the negative output terminal *c* of the input amplifier 12 at the input terminals of the zero-zero gate 20 permit a narrow N pulse to be gated via the output terminal *h* to an input terminal of the like reshaper 26.

One-quarter pulse time after the start of the T6 information period a full width pulse is transmitted by the like reshaper 26 via the output terminal *k* to the phase shifting delay line 30. Half an information period later the pulse is transmitted via the output terminal *l* of the phase shift delay line 30 to the output terminal *n* via the buffer 32. The pulse is transmitted three-quarters of an information period after the start of the T6 period and has a duration of half an information period.

Thus whenever a one follows a one or a zero follows a zero a pulse is transmitted from the output terminal *n*. The pulse has a duration of half an information period. The pulse starts three-quarters of a pulse time from the start of the information period and terminates one and one-quarter pulse times from the start of the information period.

If the output information periods are considered to start a quarter pulse time later then the input information periods it should be noted that a sequence of two unlike input information units cause the generation of a pulse occurring during the first half of the output information period and a sequence of two like information pulses causes the generation of a pulse occurring during the second half of the output information period.

It should also be noted that the reshapers introduce a quarter information period delay. A second embodiment of the invention will now be described in which no delay is introduced.

The second conversion method to accomplish the same objects is governed by the following rules. When a zero occurs a pulse is transmitted having the same phase as the previously transmitted pulse. When a one occurs a pulse is generated having a phase opposite the phase of the previously recorded pulse.

Briefly, if the previously transmitted pulse occurred during the first half of an information period and the signal to be transmitted is to represent a zero then a pulse is transmitted occurring during the first half of the information period. If the signal to be transmitted is to represent a one, a pulse is transmitted occurring during the second half of the signal period. Likewise, if the previously transmitted pulse occurred during the second half of the information period and the signal to be transmitted is to represent a zero then a pulse occurring during the second half of the signal period is transmitted; but if the signal to be transmitted is to represent a one then a pulse occurring during the first half of the signal period is transmitted.

Referring to Fig. 2, transmitting apparatus for representing the information in a modified form is shown comprising the binary counter 34 with an input terminal *a'*, a positive output terminal *o*, and a negative output terminal *p*; the phase splitting amplifier 36 having an input terminal connected to the C0 line, a positive output terminal *q* and a negative output terminal *r*; the first phase gate 38 having an output terminal *s*; the second phase gate 40 having an output terminal *t*, and the buffer 42 having an output terminal *u*.

The binary counter 34 is an electronic circuit having two stable states. In the first stable state a constant positive potential is present at the positive output terminal *o* and a constant negative potential is present at the negative output terminal *p*. In the second stable state a constant negative potential is present at the positive output terminal *o* and a constant positive potential is present at the negative output terminal *p*. The binary counter 34 will remain in either one of these two stable states until a pulse signal is fed to its input terminal *a'*, at which time the binary counter 34 will assume the other stable state in which it will remain until another trigger pulse is fed to the input terminal *a'*.

The phase splitting amplifier 36 is a pulse amplifier similar to the above-described pulse amplifiers. The first phase gate 38 and the second phase gate 40 are coincidence gates of the type previously described. The buffer 42 is similar to the above-described buffer 32.

The input terminal *a'* receives the information to be converted. The positive output terminal *o* of the binary counter 34 is coupled to an input terminal of the first phase gate 38, the negative output terminal *p* of the binary counter 34 is connected to an input terminal of the second phase gate 40. The second input terminal of the first phase gate 38 is coupled to the positive output terminal *q* of the phase splitting amplifier 36. The second input terminal of the second phase gate 40 is connected to the negative output terminal *r* of the phase splitting amplifier 36. The two input terminals of the buffer 42 are respectively connected to the output terminal *s* of the first phase gate 38 and the output terminal *t* of the second phase gate 40. The output terminal *u* of the buffer 42 can be considered to be the output terminal for the apparatus.

The apparatus of Fig. 2 will now be described in connection with the waveforms of Fig. 3 and the conversion of the information represented by 10110011. It will be assumed that the previously transmitted pulse signal occurred during the second half of the information period.

At the beginning of the T1 information period a one is present at the input terminal *a'* and the binary counter 34 is triggered to the first stable state. The positive output terminal *o* of the binary counter 34 assumes a positive potential and the negative output terminal *p* assumes a negative potential. The positive potential fed to an input terminal of the first phase gate 38 permits a pulse from the output terminal *q* of the phase splitting amplifier 36 to pass via the output terminal *s* of the first phase gate 38 through the buffer 42 to the output terminal *u*.

At the beginning of the T2 information period a zero is present at the input terminal *a'*. Since a zero is represented by the absence of a pulse the binary counter 34 is not triggered hence it remains in the first stable state. A pulse fed from the positive output terminal *q* of the phase splitting amplifier 36 is passed through the first phase gate 38 to the output terminal *u* via the buffer 42.

At the beginning of the T3 information period a one is present at the input terminal *a'* and the binary counter 34 is triggered to its second stable state. The positive output *o* assumes a negative potential and the negative output *p* assumes a positive potential. The positive potential is fed to an input terminal of the second phase gate 40 permitting a pulse of opposite phase generated by the phase splitting amplifier 36 to be transmitted from the negative output terminal *p* and through the second phase gate 40 to the output terminal *u* via the buffer 42.

The remaining information signals are converted in a similar manner. The phase of the pulse that is transmitted by the output terminal *u* is governed by the state of the binary counter 34. Since the binary counter 34 changes state upon receiving a pulse from the input terminal *a'* it is seen that whenever a one is to be transmitted the pulse phasing is changed and whenever a zero is to be transmitted the pulse phasing remains the same.

The waveforms so generated can be utilized in numerous ways. One important application is in the field of magnetic recording where the magnetic medium acts as a storage means. For example, the waveforms, as current pulses, are fed through a recording head to form a corresponding magnetization pattern on the surface of a rotating magnetic drum or disc. At a later time, as the pattern moves opposite a reproducing head, voltages corresponding to the time derivative of the magnetization pattern are induced in the reproducing head.

Figure 4:
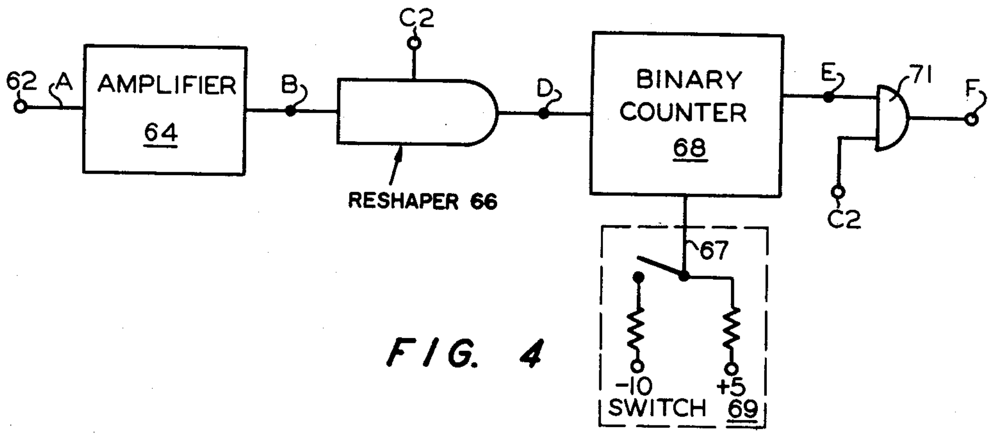
Fig. 4 shows a block diagram of apparatus for restoring the signals converted by the apparatus of Fig. 1 to their original representation.

In Fig. 4 apparatus is shown for converting the playback waveform of a magnetization pattern that was recorded on a magnetic medium by feeding the signal from the output *n* of the apparatus of Fig. 1 via a suitable recording amplifier (any well known transformer-coupled current amplifier) to a recording head.

The conversion apparatus comprises the input terminal 62 coupled to the amplifier 64, the reshaper 66 fed via the line B by the amplifier 64, the binary counter 68 having an initial clear terminal 67, the switch 69 and the gate 71.

With the exception of the amplifier 64, the components are similar to previously cited units. The amplifier 64 can be a standard linear high-gain-triode voltage amplifier that feeds a cathode-follower amplifier for providing a signal having sufficient amplitude to drive the reshaper 66.

Figure 6:
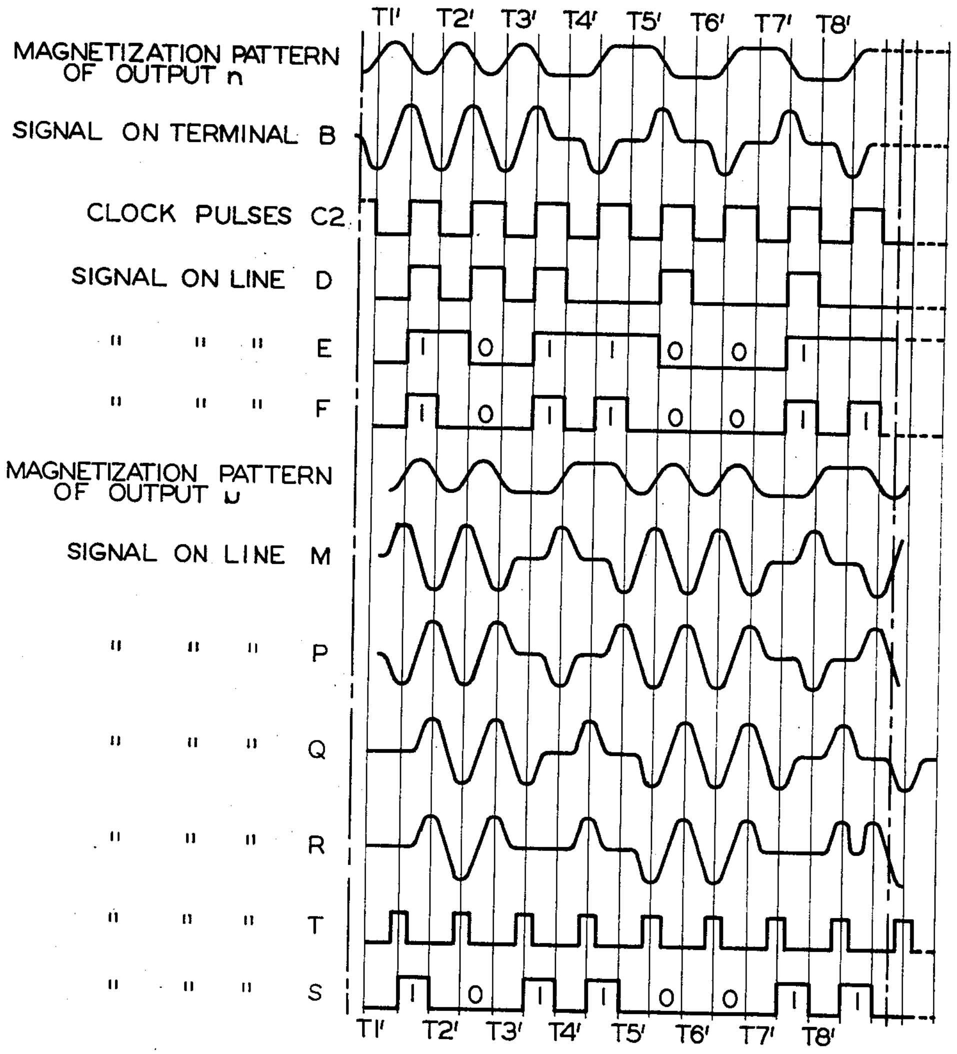
Fig. 6 shows waveforms illustrating the reconversion methods of the invention and signals present at pertinent locations in the apparatus shown in Fig. 4 and Fig. 5.

Fig. 6 shows waveforms associated with the reproducing apparatus. It is seen that the magnetization pattern corresponding to the waveform present at output terminal *n* of Fig. 3 is not as sharply defined, the pattern having lost its "squareness." This phenomenon is due to fringing flux in the recording head. It should be noted that, since the amplifier 64 is designed to be linear, the signal present on the line B is the undistorted negative time derivative of the magnetization pattern.

The signal present on the line B is fed to an input terminal of the reshaper 66. It is necessary to synchronize the clocking pulses of the reshaper with the playback signal such that the leading edge of the clocking signal occurs where the positive lobes of the playback signal attain maximum amplitude. This is readily accomplished by a suitable choice of the clock pulse phase or by delaying the playback signal a suitable amount of time before it is fed to the reshaper 66. Thus, whenever there is a time coincidence between the clocking pulse (in the example cited the C2 signal) and a positive lobe of the playback signal, the reshaper passes a C2 pulse to its output terminal which is coupled to the line D.

Each time a pulse present on the line D is fed to the binary counter 68 the binary counter changes state. Just prior to receiving information, the switch 69 is momentarily closed insuring that the binary counter is in the first stable state (the positive output terminal is at a negative potential). The positive output terminal of the binary counter 68, which is coupled via the line E to an input terminal of the gate 71, provides the desired gating voltages necessary for passing the C2 signals through the gate 71 to the line F.

Hence, by periodically testing the playback voltage for a particular characteristic, namely the positive lobe, an indication of the change in the type of information is obtained. To determine which unit of information (a one or a zero) is being received, it is necessary to know the previous unit of information. The binary counter 68 thus serves as the memory device and will give a true indication of the unit of information provided its state is fixed at the beginning of reception.

Figure 5:
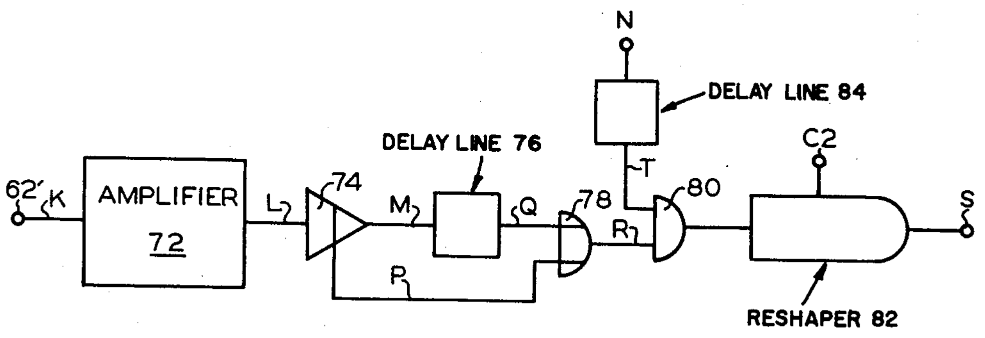
Fig. 5 shows a block diagram of apparatus for restoring the signals converted by the apparatus of Fig. 2 to their original representation.

Fig. 5 shows apparatus for converting signals induced from a magnetization pattern that is generated by the apparatus of Fig. 2. The apparatus is shown comprising the linear amplifier 72 coupled via the line K to the input terminal 62'; the pulse amplifier 74 coupled to the linear amplifier 72 via the line L; the half-pulse time delay line 76 linked to the positive output terminal of the pulse amplifier 74 by the line M; the buffer 78 having one input terminal coupled to the output of the delay line 76 via the line Q and the other input terminal linked by the line P to the negative output terminal of the pulse amplifier 74; the gate 80 coupled to the output terminal of the buffer 78 by the line R; the reshaper 82 whose input terminal is connected to the output of the gate 80; and the quarter pulse delay line 84 which feeds an input terminal of the gate 80 via the line T.

The amplifier 72 can be any linear voltage amplifier such as a two-stage triode voltage amplifier. The pulse amplifier 74, the delay lines 76 and 84, the buffer 78, the gate 80 and the reshaper 82 are similar to previously described components.

Referring to Fig. 6, the waveforms of the magnetization pattern generated by current pulses derived from the output terminal *u* of Fig. 2 is shown for the number representation (10110011). The signal present on the line L is the time derivative of the magnetization pattern. The pulse amplifier 74 transmits the waveform uninverted from its positive output terminal to the delay line 76 via the line M and transmits the inverse of the waveform from its negative output terminal via the line P to the buffer 78. After a delay of approximately half an information period the uninverted waveform is transmitted to the buffer 78 via the line Q. The buffer 78, performing its usual function of transmitting the most positive voltage present at its input terminals, effectively selects the coincidences of the negative lobes of the two waveforms.

The time of occurrence of the narrow N pulses fed via the delay line 84 and the line T to an input of the gate 80 is adjusted by the delay introduced by the delay line 84. It should be noted that each negative lobe effectively encompasses a narrow pulse present on the line T. Thus, whenever there is a time coincidence between a negative lobe and a narrow pulse at the inputs of the gate 80, the narrow pulse is not transmitted. At all other times the narrow pulse is transmitted.

The narrow pulses so transmitted from the output terminal of the gate 80 are fed to the input terminal of the reshaper 82. The reshaper 82 performs the function of reshaping and retiming the narrow pulses and passes full width pulses in synchronism with the C2 signal from its output terminal to the line S. When account is taken for the half-pulse time delay introduced by the delay line 76, it should be noted that the signal present on the line S represents the pulse-no pulse representation of the information (10110011).

Just as with the apparatus described in Fig. 4 it is necessary to have a memory element in the apparatus. The delay line 76 serves the function of temporarily "remembering" the quality of a portion of the signal for comparison with another portion of the signal. Thus, again the information transferred is dependent on the previous information transferred.

Several timing signals have been employed in the description of the apparatus. In Fig. 8 is shown apparatus for generating these timing signals from a standard clock pulse source.

The timing signal source is shown comprising a clock pulse source 46 having a C0 signal output, a delay line 48 having output terminals 50, 52 and 54, a gate 60, a C1 signal amplifier 56, and an N signal amplifier 58.

The clock pulse source 46 feeds the input terminal of the delay line 48 via the C0 signal output terminal. The tap 52 of the delay line 48 feeds the input terminal of the C1 amplifier 56. The two input terminals of the gate 60 are respectively connected to the delay line 48 via the output terminals 50 and 54. The output terminal of the gate 60 is connected to the N signal amplifier 58. The output of the C1 signal amplifier 56 is coupled to the C1 signal line and the output of the N signal amplifier 58 is linked to the N signal line.

The clock pulse signal source 46 is any standard square-wave generator producing a square wave having a periodicity equal in time to the desired information period. This square wave is designated as the C0 signal. The C0 signal delayed one-quarter of an information period by the delay line 48 is fed via the output terminal 52 to the C1 signal amplifier 56 for generating a second square-wave signal of the same periodicity and amplitude as the C0 signal but one-quarter of an information period later in phase than the C0 signal. The C0 signal delayed one-eighth of an information period by the delay line 48 is gated with the C0 signal delayed three-eighths of an information period by the gate 60 to form a narrow pulse fed to the N signal amplifier 58. The N signal so generated is a narrow pulse having a periodicity equal to the period of the C0 signal and a duration equal to one-quarter of an information period. The start of each narrow pulse is one-eighth of an information period later than the start of the positive portion of the C0 square wave.

*Description of symbols*

The schematic equivalents of the symbols employed to simplify the detailed description of the units of the apparatus which have been illustrated in block form are shown in Figs. 7*a* through 7*p*. For convenient reference, all positive and negative supply buses will generally be identified with a number corresponding with their voltage. The circuitry terminals corresponding to the same symbol terminals are identified by the same character reference numbers.

*Gate*

The gates used in the apparatus are of the "coincidence" type, each comprising a crystal diode network which functions to receive input signals via a plurality of input terminals and to pass the most negative signal.

The symbol for a representative gate 122, having two input terminals 124 and 126, is shown in Fig. 7*a*. For illustrative purposes, the signal potential levels are plus five volts (positive signals) and minus ten volts (negative signals), the potentials of the signals which may exist at the input terminals 124 and 126 are thereby limited.

If a potential of minus ten volts is present at one or both of the input terminals 124 and 126, a potential of minus ten volts exists at the output terminal 144. Therefore, if one of the input signals to the input terminals 124 and 126 is positive and the other signal is negative, the negative signal is passed and the positive signal is "blocked."

When there is a coincidence of positive signals at the two input terminals 124 and 126, a positive signal is transmitted from the output terminal 144. In such case, it may be stated that a positive signal is "gated" or "passed" by the gate 122.

The schematic details of the gate 122 are shown in Fig. 7*b*. Gate 122 includes the crystal diodes 128 and 130. Each of the input terminals 124 and 126 is coupled to one of the crystal diodes 128 and 130. Crystal diode 128 comprises the cathode 132 and the anode 134. Crystal diode 130 comprises the anode 138 and the cathode 136. More particularly, the input terminals 124 and 126 are respectively coupled to the cathode 132 of the crystal diode 128 and the cathode 136 of the crystal diode 130. The anode 134 of the crystal diode 128 and the anode 138 of the crystal diode 130 are interconnected at the junction 140. The anodes 134 and 138 are coupled via the resistor 142 to the positive voltage bus 65.

If negative potentials are simultaneously present at the input terminals 124 and 126, both of the crystal diodes 128 and 130 conduct, since the positive supply bus 65 tends to make the anodes 134 and 138 more positive. The voltage at the junction 140 will then be minus ten volts since, while conducting, the anodes 134 and 138 of the crystal diodes 128 and 130 assume the potential of the associated cathodes 132 and 136.

When a positive signal is fed only to the input terminal 124, the cathode 132 is raised to a positive five volts potential and is made more positive than the anode 134, so that crystal diode 128 stops conducting. As a result, the potential at the junction 140 remains at the negative ten volts level. In a similar manner, when a positive signal is only present at the input terminal 126, the voltage at the junction 140 will not be changed.

When the signals present at both input terminals 124 and 126 are positive, the anodes 134 and 138 are raised to approximately the same potential as their associated cathodes 132 and 136 and the potential at the junction 140 rises to a positive potential of five volts.

The potential which exists at the junction 140 is transmitted from the gate 122 via the connected output terminal 144.

In the above described manner, the gate 122 is frequently used as a switch to govern the passage of one signal by the presence of one or more signals which control the operation of the gate 122.

It should be understood that the potentials of plus five volts and minus ten volts used for purpose of illustration are approximate, and the exact potentials will be affected in two ways. First, they will be affected by the value of the resistance 142 and its relation to the impedances of the input circuits connected to the input terminals 124 and 126. Second, they will be affected by the fact that a crystal diode has some resistance (i.e. is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 144 to prevent the terminal from becoming more negative than a predetermined voltage level to protect the diodes 128 and 130 against excessive back voltages and to provide the proper voltage levels for succeeding circuits.

*Buffer*

The buffers used in the apparatus are also known as "or" gates. Each buffer comprises a crystal diode network which functions to receive input signals via a plurality of input terminals and to pass the most positive signal.

The symbol for a representative buffer 146, having two input terminals 148 and 150, is shown in Fig. 7*c*. Since the signal potential levels in the system are assumed to be minus ten volts and plus five volts, either one of these potentials may exist at the input terminals 148 and 150.

If a positive potential of five volts exists at one or both of the input terminals 148 or 150, a positive potential of five volts exists at the output terminal 168. If a negative potential of ten volts is present at both of the input terminals 148 and 150, a negative potential of ten volts will be present at the output terminal 168.

The schematic details of the buffer 146 are shown in Fig. 7*d*. The buffer 146 includes the two crystal diodes 152 and 154. The crystal diode 152 comprises the anode 156 and the cathode 158. Crystal diode 154 comprises the anode 160 and the cathode 162. The anode 156 of the crystal diode 152 is coupled to the input terminal 148. The anode 160 of the crystal diode 154 is coupled to the input terminal 150. The cathodes 158 and 162 of the crystal diodes 152 and 154, respectively, are joined at the junction 164 which is coupled to the output terminal 168, and via the resistor 166 to the negative supply bus 70. The negative supply bus 70 tends to make the cathodes 158 and 162 more negative than the anodes 156 and 160, respectively, causing both crystal diodes 152 and 154 to conduct.

When negative ten volt signals are simultaneously present at input terminals 148 and 150, the crystal diodes 152 and 154 are conductive, and the potential at the cathodes 158 and 162 approaches the magnitude of the potential at the anodes 156 and 160. As a result, a negative potential of ten volts appears at the output terminal 168.

If the potential at one of the input terminals 148 or 150 increases to plus five volts, the potential at the junction 164 approaches the positive five volts level as this voltage is passed through the conducting crystal diode 152 or 154 to which the voltage is applied. The other crystal diode 152 and 154 stops conducting since its anode 156 or 160 becomes more negative than the junction 164. As a result, a positive potential of five volts appears at the output terminal 168.

If positive five volt signals are fed simultaneously to both input terminals 148 and 150, a positive potential of five volts appears at the output terminal 168, since both crystal diodes 152 and 154 will remain conducting. Thus the buffer 146 functions to pass the most positive signal received via the input terminals 148 and 150.

*Delay line*

The symbol for a representative electrical delay line 171 which is a lumped parameter type delay line and which functions to delay received pulses for discrete periods of time, is shown in Fig. 7*e*.

The delay line 171 comprises the input terminal 172, the output terminal 188, and a plurality of taps 180, 182, and 184. A pulse which is fed via the input terminal 172 to the delay line 171 will be delayed for an increasing number of pulse times before successively appearing at the taps 180, 182 and 184. When the pulse reaches the output terminal 188, the total delay provided by the delay line 171 has been applied. In the preceding text, the specific number of pulse-times delay which is encountered before a pulse travels from the input terminal to a tap of the delay line has been stated.

The delay line 171 shown in Fig. 7*f* comprises a plurality of inductors 176 connected in series, with the associated capacitors 178 which couple a point 174 on each inductor 176 to ground. A signal is fed into the relay line 171 at the input terminal 172 and the maximum delay occurs at the output terminal 188. The taps 180, 182 and 184 are each connected to one of the points 174 and provide varied delays. The delay line 171 is terminated by a resistor 186 in order to prevent reflections. Although in the delay line of Fig. 7*f* a tap is shown connected to each of the points 174, it should be understood that in actual practice there are ordinarily several untapped points 174 between successive taps.

*Pulse amplifier*

The symbol for a representative pulse amplifier is shown in Fig. 7*g*. When a positive pulse is fed to the pulse amplifier 190 via the input terminal 192 the pulse amplifier 190 functions to transmit a positive pulse which swings from minus ten to plus five volts from its positive output terminal 224, and a negative pulse which swings from plus five to minus ten volts from its negative output terminal 226. At all other times, the pulse amplifier 190 has a negative potential of ten volts at its positive output terminal 224 and a positive potential of five volts at its negative output terminal 226.

The detailed circuitry of the pulse amplifier 190 is shown in Fig. 7*h*. The pulse amplifier 190 includes the vacuum tube 208, the pulse transformer 216 and associated circuitry. The vacuum tube 208 comprises the cathode 214, the grid 212 and the anode 210. The pulse transformer comprises the primary winding 218 and the secondary windings 220 and 222.

The crystal diode 194 couples the grid 212 of the vacuum tube 208 to the input terminal 192, the anode 196 of the crystal diode 194 being coupled to the input terminal 192, and the cathode 198 being coupled to the grid 212. The negative supply bus 70 is coupled to the grid 212 via the resistor 200 and tends to make the crystal diode 194 conductive. The grid 212 and the cathode 198 of the crystal diode 194 are also coupled to the cathode 204 of the crystal diode 202, whose anode 206 is coupled to the negative supply bus 5. The crystal diode 202 clamps the grid 212 at a potential of minus five volts thus preventing the voltage applied to the grid 212 from becoming more negative than minus five volts.

When a voltage more positive than minus five volts is transmitted to the input terminal 192, the crystal diode 194 conducts and the voltage is applied to the grid 212. Since the crystal diode 202 clamps the grid 212 and the cathode 198 of the crystal diode 194 at minus five volts, any voltage more negative than minus five volts will cause the crystal diode 194 to become nonconductive, and that input voltage will be blocked at the crystal diode 194. Thus, the clamping action of the crystal diode 202 will not affect the circuitry which supplies the input voltage.

The cathode 214 of the vacuum tube 208 is connected to ground potential. The anode 210 of the vacuum tube 208 is coupled by the primary winding 218 of the pulse transformer 216 to the positive supply bus 250. The outer ends of the secondary windings 220 and 222 of the pulse transformer 216 are coupled respectively to the positive output terminal 224 and the negative output terminal 226. The inner ends of the secondary windings 220 and 222 are coupled respectively to the negative supply bus 10 and the positive supply bus 5.

A positive pulse which is fed to the grid 212 of the vacuum tube 208 will be inverted at the primary winding 218 of the pulse transformer 216 which is wound to produce a positive pulse in the secondary winding 220 and a negative pulse in the secondary winding 222.

These pulses respectively drive the positive output terminal 224 up to a positive five volts potential and the negative output terminal 226 down to a negative ten volts potential because of the circuit parameters.

When the vacuum tube 208 is non-conducting, the negative ten volts potential is fed through the secondary winding 220 and appears at the positive output terminal 224. At the time time, the positive five volts potential is fed through the secondary winding 222 to the negative output terminal 226. These latter conditions are the normally existing conditions at the output terminals 224 and 226.

*D.-C. amplifier*

The symbol for a representative D.-C. amplifier 248 is shown in Fig. 7*i*. When a positive signal is present at the input terminal 250, a positive signal of five volts appears at the positive output terminal 336 and a negative signal of ten volts is present at the negative output terminal 338. If a negative potential is present at the input terminal 250, the potentials at the output terminals 336 and 338 are reversed.

As shown in Fig. 7*j*, the D.-C. amplifier 248 includes the gate 254, the buffer 256, the vacuum tube 260, the transformer 283, the full-wave rectifiers 286 and 288, and the filters 320 and 314.

The input terminal 250 is connected to one input terminal of the gate 254. The other input of the gate 254 is fed a one megacycle carrier signal from the signal generator 252 which is a signal generator of known type. The megacycle carrier signal swings from minus ten to plus five volts.

One input of the buffer 256 is connected to the output of the gate 254. The other input of the buffer 256 is connected to the negative supply bus 5. The buffer 256 couples the output of the gate 254 to the control grid 270 of the vacuum tube 260.

The vacuum tube 260 is a five element tube having a grounded cylindrical shield 264, and includes the anode 262 connected via the primary winding 282 of the transformer 283 to a positive supply bus 250. The junction of the positive supply bus 250 and the primary winding 282 is coupled via the capacitor 284 to ground. The vacuum tube 260 also includes the suppressor grid 266 which is connected to ground, the screen grid 268 which is connected to the positive supply bus 125 and via the capacitor 258 to ground, and the cathode 272 which is grounded.

The anode 262 of the vacuum tube 260 is also connected via the coupling capacitor 274 to the neon tube 276 which is grounded. The capacitor 280 is connected in parallel with the primary winding 282 of the transformer 283 to form the parallel tank circuit 278 which is tuned to the frequency of the carrier signal.

The full-wave rectifier 286 is connected to the secondary winding 291 having its center tap 287 connected to the negative supply bus 10. The full-wave rectifier 286 includes the pair of crystal diodes 290 and 296. The anodes 292 and 298 of the crystal diodes 290 and 296 are respectively coupled to opposite ends of the secondary winding 291 of the transformer 283, and the cathodes 294 and 300 of the crystal diodes 290 and 296 are interconnected.

The full-wave rectifier 288 is connected to the secondary winding 293 having its center tap 289 connected to the positive supply bus 5.

The full-wave rectifier 288 includes the pair of crystal diodes 302 and 308. The cathodes 304 and 310 of the crystal diodes 302 and 308 are coupled to opposite ends of the secondary winding 293, and the anodes 306 and 312 of the crystal diodes 302 and 308 are connected together.

The filter 320 which couples the cathodes 294 and 300 of the crystal diodes 290 and 296 to the positive output terminal 336 is a parallel tank circuit which includes the capacitor 324 and the inductor 322. The capacitor 326 connects the positive output terminal 336 to the negative supply bus 10. The positive output terminal 336 is also coupled via the resistor 330 to the negative supply bus 70.

The filter 314, which couples the anodes 306 and 312 of the crystal diodes 302 and 308 to the negative output terminal 338, is a parallel tank circuit which includes the capacitor 318 and the inductor 316. The capacitor 328 connects the negative output terminal 338 to the positive supply bus 5. The negative output terminal 338 is also coupled by the resistor 334 to the positive supply bus 65.

Initially, the crystal diodes 290 and 296 are in a conductive state such that the potential at the positive output terminal 336 is approximately minus ten volts. Similarly, the crystal diodes 302 and 308 are initially in a conductive state such that the potential at the negative output terminal 338 is approximately plus five volts.

When a signal is fed to the input terminal 250 it is combined with the one megacycle carrier and fed to the buffer 256. As previously noted, one input terminal of the buffer 256 is connected to a negative five volts supply bus so that all signals at the output of gate 256 which are equal to or more positive than minus five volts will be passed by the buffer 256. A signal passed by the buffer 256 is applied to the control grid 270 of the vacuum tube 260. The signal is amplified by vacuum tube 260 and appears across the parallel tank circuit 278. The parallel tank circuit 278 is tuned to the frequency of the incoming signal so that the maximum signal will be passed by the parallel tank circuit 278 to the full-wave rectifiers 286 and 288.

The full-wave rectifier 286 delivers a positive signal which is then filtered by the filter 320 to appear as a positive direct-current potential of approximately five volts at the positive output terminal 336. The full-wave rectifier 288 delivers a negative signal which is then filtered by the filter 314 to appear as a negative direct-current potential of approximately ten volts at the negative output terminal 338.

Thus, if a positive signal is present at the input terminal 250, the voltage at the positive output terminal 336 is plus five volts, and the potential at the negative output terminal 338 is minus ten volts. However, if no signal is present at the input terminal 250, the voltage at the positive output terminal 336 will be minus ten volts, and the potential at the negative output terminal 338 will be plus five volts.

Generally, it should be noted that this D.-C. amplifier is a carrier type D.-C. amplifier with positive and negative output signals comprising only one vacuum tube and producing output signals equal in magnitude to the input signals. It should also be noted that the D.-C. amplifier includes a transformer and rectifiers for producing output signals of the desired magnitude from a low impedance source, the D.-C. amplifier thereby being especially adaptable for use in conjunction with networks of crystal diodes.

*Set dominant flip flop*

A set dominant flip flop of the type used in the apparatus is a bi-stable electronic circuit with two output terminals, one of which is maintained at one potential level and the other of which is maintained at a second potential level to indicate one stable state. Upon receipt of a signal of suitable magnitude at its input the potential levels of the two output terminals are interchanged to indicate a second stable state.

The symbol for a representative set dominant flip flop 340 is illustrated in Fig. 7*k*. The set dominant flip flop 340 comprises the input terminal 342, the reset terminal 352, positive output terminal 354, and negative output terminal 356.

One stable state of the set dominant flip flop 340 is the normal condition which is designated "reset" and exists when a negative potential of ten volts appears at the positive output terminal 354 and a positive potential of five volts appears at the negative output terminal 356. The second stable state is designated "set" and exists when a positive potential of five volts appears at the positive output terminal 354 and a negative potential of ten volts appears at the negative output terminal 356.

The set dominant flip flop 340 is set when a positive input signal is received via its input terminal 342, and this is true irrespective of any reset signal which may simultaneously be transmitted to the reset terminal 352 of the set dominant flip flop 340.

Once set, the set dominant flip flop remains set as long as positive signals are received via the reset terminal 351 even though the "setting" pulse or signal has terminated. When the signal received via the reset terminal 352 becomes negative, the set dominant flip flop 340 is reset unless a positive pulse or signal is simultaneously being received via the input terminal 342.

Stated more generally, the set dominant flip flop 340 is set by the receipt of a positive input signal via the input terminal 342 and is reset by a coincidence of a negative input signal and a reset signal. After being reset, the set dominant flip flop 340 remains reset until the above recited set conditions are fulfilled.

The detailed circuitry of the set dominant flip flop 340 is illustrated in Fig. 7 employing some of the logical symbols previously described.

The set dominant flip flop 340 comprises the buffer 346, the D.-C. amplifier 248 and the gate 348.

The input terminal 342 is the input terminal of the buffer 346. A positive signal which is transmitted to the input terminal 342 is passed through the buffer 346 to the D.-C. amplifier 248, and causes the D.-C. amplifier 248 to generate a positive potential of five volts at its positive output terminal 354 and a negative potential of ten volts at its negative output terminal 356.

The gate 348 couples the positive output terminal 354 of the D.-C. amplifier 248 to the buffer 346. When a positive signal is present at the reset terminal 352, the gate 348 passes the positive signal to the buffer 346. Thus a feedback path is provided which enables the positive potential of five volts to be maintained at the positive output terminal 354 and which is blocked only when a negative signal causes the gate 348 to be blocked.

It should be noted that a reset signal which causes the gate 348 to be blocked will not prevent a set signal at the buffer 346 from causing the D.-C. amplifier 248 to generate a positive potential of five volts at its positive output terminal 354 during the existence of the set signal.

*Binary counter stage*

The symbol for a single stage binary counter 400 is shown in Fig. 7*m*.

The stage 400 includes the input terminal 402, the clear terminal 406, the positive output terminal 408 and the negative output terminal 410.

The stage 400 may be in either of two stable states, hereinafter designated the first and second states. While in the second or reset state, the stage 400 transmits minus ten volts from the positive output terminal 408 and plus five volts from the negative output terminal 410. While in the first state, the stage 400 transmits plus five volts from the positive output terminal 408 and minus ten volts from the negative output terminal 410.

Each input pulse received by the input terminal 402 causes the stage 400 to change state. Thus, assuming the stage 400 is initially in the second or reset state, three successive input pulses causes the stage 400 to be sequentially in the first, second and first states.

The stage 400 can always be reset to the second state by the transmission of a negative signal to the clear terminal 406 which is otherwise normally maintained at a positive potential.

The logical details of the stage 400 are illustrated in Fig. 7*n* and include the gate 420, the pulse amplifier 422, the flip flop 340, the delay line 426 and the buffer 428. The delay line 426 provides a delay of three-quarters of a pulse period.

The input terminal 402 is connected to the pulse amplifier 422.

The positive output terminal of the amplifier 422 is connected to one input of the gate 420. The negative output terminal of the amplifier 422 is connected to one input of the buffer 428.

The clear terminal 406 is connected to a second input of the gate 420 whose output is coupled to the flip flop 340. The positive output of the flip flop 340 is connected to the positive output terminal 408, while the negative output thereof is connected to the negative output terminal 410 and via the delay line 426 to the remaining input of the gate 420.

The output of the delay line 426 is also coupled to the remaining input of the buffer 428 whose output is connected to the reset terminal of the flip flop 340.

When the flip flop 340 is in the second or reset state, a positive signal appears at its negative output terminal and is fed via the delay line 426 to one input of the gate 420 and the buffer 428. Assuming that the potential at the clear terminal 406 is positive, the gate 420 is primed to receive a positive pulse. As a result, when a positive pulse is applied via the input terminal 402 to the amplifier 422, the amplifier 422 transmits a positive pulse to the gate 420, and a negative pulse to one input of the buffer 428. The positive signal at the negative output of the flip flop 340 is maintained for three-quarters of a pulse period after the flip flop 340 is set to insure that the gate 420 is not blocked until the flip flop 340 is set. The amplifier 422 also transmits a negative pulse to the buffer 428, but does not affect the potential of the output of this buffer, since the other input of the buffer 428 is being held positive by the signal from the delay line 426. This signal remains positive for three-quarters of a pulse time after the flip flop 424 is set, by which time the negative pulse has ended and the negative output of the amplifier 422 is again positive. Hence during the sequence of events just described the output of the buffer 428 remains positive at all times, and no negative signal appears at the reset terminal of the flip flop 340 to interfere with its setting.

After the stage 400 is set to its first state, the next positive pulse received by the stage 400 causes a negative potential to be applied via the negative output terminal of the amplifier 422 to the buffer 428. Since the flip flop 340 is set to its first state, a negative signal is maintained at its negative output terminal and is transmitted via the delay line 426 to the buffer 428. As both signals being fed to the buffer 428 are negative, the buffer 428 transmits a negative potential to the reset terminal of the flip flop 340 which is thus reset The negative signal from the delay line 426 blocks the gate 420, thus preventing the positive pulse from the amplifier 422 from being applied to the flip flop 340 and interfering with its resetting.

A negative signal thus appears at the positive output terminal 408 and a positive signal appears at the negative input terminal 410. The stage 400 has been returned to its second or reset state.

It should be noted that the functions of the delay line 426 include maintaining the signal from the negative output terminal 410 at the input terminals of the gate 420 and the buffer 428 until the input pulse has terminated.

Thus, the stage 400 functions to respond to an input pulse by changing states so as to interchange the signals at the positive and negative output terminals 408 and 410.

*Reshaper*

A reshaper of the type used in the apparatus is an electronic circuit which functions to reshape and retime positive pulses which have become poorly shaped and attenuated.

The symbol for a representative reshaper 429 is illustrated in Fig. 7*o* and comprises one or more input terminals of which the input terminals 430 and 431 are shown, timing terminal 438 which receives reshaping and retiming pulses (also designated clocking or C pulses), positive output terminal 444, negative output terminal 446, and blocking terminal 436 through which signals may be sent to make the reshaper 429 inoperative.

Except when positive pulses are fed to the input terminals 430 and 431 of the reshaper 429, a negative potential of ten volts is present at the positive output terminal 444 and a positive potential of five volts exists at the negative output terminal 446.

When a pulse is fed to the reshaper 429 via one or both of the input terminals 430 and 431, the pulse is reshaped by a clock pulse (received via the terminal 438), which is timed to delay the reshaped pulse for one-quarter of a pulse time, and is then transmitted from the reshaper 429 via the positive output terminal 444. While the positive pulse is being transmitted from the positive output terminal 444, a negative pulse is transmitted from the negative output terminal 446.

The detailed circuitry of the reshaper 429 is illustrated in Fig. 7*p* in which use is made of logical symbols previously described.

The reshaper 429 comprises the buffer 432, the gate 434 and the pulse amplifier 442 connected in series. A positive pulse which is fed via one or both of the input terminals 430 and 431 of the buffer 432 is passed to the gate 434. Signals may also be fed via the blocking terminal 436 to the gate 434 and if the signal is negative, the gate 434 is blocked and the reshaper 429 is inoperative. The blocking terminal 436 is generally absent and if present usually receives a positive signal.

A series of identical clock pulses which are generated in the clock pulse generator, are transmitted to the gate 434 via the clock terminal 438. The clock pulses are equal in magnitude and width to the desired shape and timing of the pulses which are to be reshaped and retimed. The clock pulses are timed so that the starting time of each clock pulse coincides approximately with the center of the pulse it is intended to reshape. This is done to assure that the pulse to be reshaped will have reached its maximum amplitude by the time the leading edge of a clock pulse arrives at the gate 434. Since in many cases the pulse to be reshaped is originally produced by a previous reshaper and thus has approximately the same width as a clock pulse, its center point will be one-quarter pulse time later than the leading edge of the clock pulse which previously reshaped it. Hence its leading edge after passing through the new reshaper will be one-quarter pulse time later than before, and on this basis it may be said that a reshaper introduces a one-quarter pulse time delay in the signals passing through it.

When the attenuated positive pulse reaches its full magnitude at the gate 434, the coinciding clock pulse is gated through to the amplifier 442 and is amplified and causes a positive pulse to be transmitted from the positive output terminal 444, and a negative pulse to be transmitted from the negative output terminal 446 at the same time.

The positive output terminal 444 is also coupled to one input of the buffer 432 so that a positive signal which appears at the positive output terminal 444 is regenerative and will continue to exist until the clock pulse terminates at the gate 434. This effectively permits the entire clock pulse to be gated through the gate 434, even though the original pulse has decayed before the end of the clock pulse.

Stated more generally, a clock pulse is passed through the gate 434 from the earliest coincidence of that clock pulse with the full magnitude of the attenuated pulse until the termination of that clock pulse. As a result, a clock pulse is substituted for the attenuated pulse in the system after a delay of one-quarter of a pulse time.

There will now be obvious to those skilled in the art many modifications and variaitons utilizing the principles set forth and realizing many or all of the objects and advantages of the circuits described but which do not depart essentially from the spirit of the invention.

What is claimed is:

1. Apparatus for converting a first series of signals, each signal being represented by the presence or absence of a pulse during each signal period, to a second series of signals, each signal being represented by the position of a pulse in each signal period, comprising a delay line responsive to said first series of signals, first and second gating means connected to said delay line and responsive to said first series of signals, first and second pulse generating means respectively responsive to said first and second gating means for producing pulse signals out of phase with each other and means responsive to said first and second pulse generating means for producing said second series of signals.

2. Signal conversion apparatus for converting a first series of pulse-no pulse signals to a second series of phase modulated signals comprising amplifying means responsive to said first series of signals, a delay means responsive to said first series of signals for delaying said first series of signals, a comparison means responsive to said amplifying means and said delay means for comparing said first series of signals with the delayed first series of signals and a pair of phase modulated signal generating means selectively energized by said comparison means for generating signals having a first or a second phase.

3. Signal conversion apparatus for converting a first series of signals having a pulse or no pulse during a signal period to a second series of signals having a pulse in a first or second portion of a signal period comprising amplifying means responsive to said first series of signals, a delay means responsive to said first series of signals for delaying said first series of signals a signal period, a comparison means responsive to said amplifying means and said delay means for comparing said first series of signals with the delayed first series of signals and a pair of pulse generating means responsive to said comparison means for generating during each signal period a pulse in either said first or said second portion of a signal period.

4. Signal conversion apparatus for converting a first series of signals composed of a plurality of equi-duration signal periods in which a pulse is present or not, to a second series signals composed of a plurality of equi-duration signal periods in which a pulse is present during either the first or second half of a signal period, comprising an amplifier responsive to said first series of signals, a delay line responsive to said first series of signals for delaying said first series of signals one signal period, a comparison means responsive to said amplifier and said delay line for comparing said first series of signals with the delayed first series of signals and a pair of pulse generators responsive to said comparison means for generating pulses either during the first half or the second half of a signal period as determined by the equality or inequality of the signals being compared.

5. Signal conversion apparatus for converting a first series of signals composed of the presence or absence of a pulse during signal periods of equal duration, to a second series of signals composed of equiduration signal periods in which a pulse is present during half of each signal period, comprising an amplifier for amplifying said first series of signals, a delay line for delaying said first series of signals one signal period, a comparator responsive to said amplifier and said delay line for comparing a signal in one signal period of said first series of signals with a signal from the next previous signal period and a pair of pulse generators selectively energized by said comparator, said pulse generator generating a pulse during the first half of a signal period or during the second half of a signal period according to predetermined relationship between the compared signals.

References Cited in the file of this patent

UNITED STATES PATENTS

| | | |
|---|---|---|
| 1,616,326 | Nelson | Feb. 1, 1927 |
| 1,807,368 | Angel | May 26, 1931 |
| 2,352,952 | Haglund | July 4, 1944 |
| 2,354,115 | Gubisch | July 18, 1944 |
| 2,700,155 | Clayden | Jan. 18, 1955 |
| 2,700,696 | Barker | Jan. 25, 1955 |
| 2,734,186 | Williams | Feb. 7, 1956 |
| 2,764,463 | Lubkin | Sept. 25, 1956 |